United States Patent [19]

Miyata et al.

[11] Patent Number: 5,094,781

[45] Date of Patent: Mar. 10, 1992

[54] FIRE-RETARDANT RESIN COMPOSITION

[75] Inventors: Shigeo Miyata, Takamatsu; Takeshi Imahashi, Nagao, both of Japan

[73] Assignee: Kyowa Chemical Industry Co., Ltd., Kagawa, Japan

[21] Appl. No.: 501,764

[22] Filed: Mar. 30, 1990

[30] Foreign Application Priority Data

Apr. 7, 1989 [JP] Japan ..................... 1-87044

[51] Int. Cl.$^5$ ............................................. C09K 21/00
[52] U.S. Cl. ..................................... 252/609; 524/432; 524/436; 524/437
[58] Field of Search ......................... 252/601, 609, 602; 524/401, 436, 437, 432; 106/18.25, 18.26

[56] References Cited

U.S. PATENT DOCUMENTS

| | | | |
|---|---|---|---|
| 4,468,495 | 8/1984 | Pearson | 525/158 |
| 4,549,041 | 10/1985 | Singo et al. | 174/113 R |
| 4,671,896 | 6/1987 | Hasegawa et al. | 252/609 |
| 4,680,227 | 7/1987 | Aoyagi et al. | 428/331 |
| 4,729,854 | 3/1988 | Miyata et al. | 252/609 |
| 4,869,848 | 9/1989 | Hasegawa et al. | 252/609 |
| 4,885,328 | 12/1989 | Danforth et al. | 524/436 |
| 4,983,742 | 1/1991 | Yusawa et al. | 524/436 |
| 5,021,497 | 6/1991 | O'Hara et al. | 524/436 |
| 5,025,058 | 6/1991 | Senoo | 524/436 |

*Primary Examiner*—Robert L. Stoll
*Assistant Examiner*—N. Bhat
*Attorney, Agent, or Firm*—Wenderoth, Lind & Ponack

[57] ABSTRACT

A fire retardant comprising 100 parts by weight of a metal hydroxide and 0.1 to 50 parts by weight of an acrylic fiber, and a fire-retardant resin composition comprising 20 to 80% by weight of a synthetic resin or rubber, 80 to 20% by weight of a metal hydroxide and 0.1 to 10 parts by weight, based on 100 parts by weight of the synthetic resin or rubber and the metal hydroxide in total, or an acrylic fiber. The present composition has improved fire retardancy free from degradation in mechanical strength and deterioration of water resistance, and the present fire retardant permits free coloring and releases no toxic smoke.

13 Claims, No Drawings

FIRE-RETARDANT RESIN COMPOSITION

FIELD OF THE INVENTION

This invention relates to a fire-retardant resin composition and a fire retardant. More specifically, it relates to a fire retardant comprising a metal hydroxide and an acrylic fiber, and a fire-retardant resin or rubber composition which is prepared by incorporating said fire retardant into a synthetic resin or rubber and which therefore has improved mechanical strength and water resistance and can be freely colored.

PRIOR ART

Synthetic resins such as a resin and rubber (to be generally referred to as a synthetic resin in the present specification) have fire retardancy themselves, and there are therefore a variety of proposals for retardancy properties achievement to prevent various disasters caused by fires, etc.

As a fire-retardant resin composition, there has been a proposal for a resin composition prepared by incorporating an organic halide or a combination of an organic halide with antimony trioxide into a synthetic resin. However, this resin composition has had the following defects: It corrodes a molding machine when molded, it releases a large amount of smoke when a fire occurs, and the smoke is toxic and corrosive.

In order to overcome the above defects, a resin composition using, as a clean fire retardant, a metal hydroxide such as aluminum hydroxide or magnesium hydroxide has attracted attention and has been put to use in some fields. Further, there has been a proposal for a resin composition using a combination of a metal hydroxide with carbon black or red phosphorus.

The resin composition prepared by incorporating a metal hydroxide, as a fire retardant, into a synthetic resin has a low fire-retardancy effect per unit weight of the metal hydroxide. Thus, it is necessary to incorporate the metal hydroxide in an amount about three times as large as that of the above organic halide. Hence, such a resin composition involves problems that the metal hydroxide degrades mechanical strength of the synthetic resin, which degradation is not negligible, and it also deteriorates water resistance of the synthetic resin.

The resin composition using a combination of a metal hydroxide with carbon black has a problem that the resultant molded article has a black color and cannot be freely colored. The resin composition using a combination of a metal hydroxide with red phosphorus has a problem that the red phosphorus is toxic and gives a red color, and the resultant molded article cannot be freely colored.

SUMMARY OF THE INVENTION

It is an object of this invention to provide a fire retardant which can overcome the above problems and improve fire retardancy without degrading mechanical strength of a resin composition and without deteriorating its water resistance, and a resin composition having improved fire retardancy.

It is another object of this invention to provide a fire retardant which permits free coloring and releases no toxic smoke, and a resin composition containing the fire retardant.

According to this invention, there is provided a resin composition comprising 20 to 80% by weight of a synthetic resin or rubber, 80 to 20% by weight of a metal hydroxide and 0.1 to 10 parts by weight, based on 100 parts by weight of the synthetic resin and the metal hydroxide in total, of an acrylic fiber.

According to this invention, there is further provided a fire retardant comprising 100 parts by weight of a metal hydroxide and 0.1 to 50 parts by weight of an acrylic fiber.

DETAILED DESCRIPTION OF THE INVENTION

The present inventors have made a diligent study of problems of prior art techniques, and as a result, found that the use of a metal hydroxide and a small amount of an acrylic fiber as fire retardants can give a resin composition which overcomes the above problems, i.e. a resin composition which is colorless and nontoxic and which exhibits no decrease in mechanical strength and water resistance.

The scope of the synthetic resin used in this invention includes a synthetic resin and a synthetic rubber, and examples thereof are thermoplastic resins such as polyethylene, a copolymer of ethylene and other α-olefin, a copolymer of ethylene and vinyl acetate, ethyl acrylate or methyl acrylate, polypropylene, a copolymer of propylene and other α-olefin, polybutene-1, polystyrene, a copolymer of styrene and acrylonitrile, ethylene propylene diene terpolymer (to be referred to as EPDM hereinbelow) or butadiene, polyvinyl acetate, polyacrylate, polymethacrylate, polyurethane, polyester, polyether, polyamide, etc.; thermosetting resins such as phenolic resin, melamine resin, epoxy resin, unsaturated polyester resin, alkyd resin, etc.; and synthetic rubbers such as EPDM, SBR, NBR, butyl rubber, isoprene rubber, urethane rubber, acryl rubber, chloroprene rubber, chlorosulfonated polyethylene, etc.

The metal hydroxide used in this invention means a hydroxide of a divalent or trivalent metal such as aluminum hydroxide, magnesium hydroxide, calcium hydroxide, etc. These metal hydroxides have a BET specific surface area of 1 to 20 $m^2/g$, preferably 1 to 10 $m^2/g$, and a BET specific surface area/Blaine specific surface area ratio of 1 to 3, preferably 1 to 2. Such metal hydroxides are useful in view of processability, molded article appearance, mechanical strength, fire retardancy, etc.

Further, these metal hydroxides may be those which are treated with a surface treating agent. Preferable examples of the surface treating agent are as follows:

Higher fatty acids such as oleic acid, stearic acid, etc., or metal acids thereof; silane coupling agents such as vinylethoxysilane, vinyl-tris(2-methoxy)silane, gamma-methacryloxypropyltrimethoxysilane, gamma-aminopropyltrimethoxysilane, beta-(3,4-epoxycyclohexyl)ethyltrimethoxysilane, gamma-glycidoxypropyltrimethoxysilane, gamma-mercaptopropyltrimethoxysilane, etc.; titanate-based coupling agents such as isopropyltriisostearoyltitanate, isopropyltris(dioctylpyrophosphate)titanate, isopropyltri(N-aminoethylaminoethyl)titanate, isopropyltridecylbenzenesulfonyltitanate, etc.; aluminum-based coupling agents such as acetoalkoxyaluminumdiisopropylate, etc.; and esters prepared by phosphoric acid partial esterification such as acid or alkali metal salts of mono- or diester of orthophosphoric acid and alcohol, mono- or diester of orthophosphoric acid and stearyl alcohol, etc.

The amount of the surface treating agent for use is preferably about 0.1 to 10 parts by weight based on 100 parts by weight of the metal hydroxide.

The acrylic fiber used in this invention means a synthetic fiber formed mainly of an acrylonitrile polymer or copolymer, and its examples are an acrylonitrile polymer and a copolymer of acrylonitrile and methyl acrylate, vinyl acetate, methyl methacrylate, acrylic acid, methacrylic acid, vinyl chloride, vinylidene chloride, or the like.

The amount of the acrylic fiber for use is about 0.1 to 10 parts by weight, preferably about 0.5 to 5 parts by weight, based on 100 parts by weight of 20 to 80% by weight of the synthetic resin and 80 to 20% by weight of the metal hydroxide in total. When the acrylic fiber amount is less than the above lower limit, the effect on fire retardancy improvement is insufficient. Even if this amount exceeds the above upper limit, the effect on fire retardancy improvement is not specially enhanced, and the resins tend to be colored yellow.

The method of mixing the synthetic resin, the metal hydroxide and the acrylic fiber is not critical, and any method is usable if these components can be uniformly mixed. For example, these components are preliminarily mixed, and then melt-mixed in an open roll, single- or twin-screw extruder, Banbury mixer, or the like.

The molding method of the resultant resin composition is not critical, either. For example, injection molding, extrusion molding, blow molding, press molding, rotary molding, calender molding, sheet forming molding, and the like can be employed.

It is possible to incorporate a variety of additives into the fire-retardant resin composition of this invention. Several examples of such additives are as follows.

Fire-retardant auxiliaries such as an antioxidant, ultraviolet ray preventor, crosslinking agent, colorant, lubricant, carbon black, red phosphorus, tin and inorganic acids thereof, anthracene, etc.; reinforcing agents such as a glass fiber, fibrous magnesium hydroxide, etc.; and the like.

According to this invention, there are provided a fire retardant which does not degrade mechanical strength and water resistance of synthetic resins, and a composition of a fire-retardant synthetic resin containing the fire retardant.

According to this invention, there are provided a nontoxic and substantially white fire retardant and a composition of a fire-retardant synthetic resin containing the fire retardant.

According to this invention, there is provided a freely colorable composition of a fire-retardant synthetic resin.

This invention will be explained more in detail by reference to Examples hereinbelow.

In the present invention, the BET specific surface area and the Blaine specific surface area were measured in the following methods.

BET specific surface area:

Measured in three-point plotting method according to a nitrogen adsorption method. An $N_2$ molecule adsorption area was calculated as 16.2 $Å^2$. Samples for measurement were subjected to gas exhaustion treatment under vacuum at 100° C. for 30 minutes, and isothermic lines of nitrogen adsorption were measured.

Blaine specific surface area:

Measurement was made according to JIS R 5201-1987.

EXAMPLES 1–4 and COMPARATIVE EXAMPLES 1–3

An impact resistance-graded polypropylene, a magnesium hydroxide having a BET specific surface area of 8 $m^2/g$, a BET specific surface area/Blaine specific surface area ratio of 1.5 and an average secondary particle diameter of 0.7 $\mu m$ and surface-treated with 2.5% by weight of stearic acid, and an acrylic fiber formed of an acrylonitrile/vinyl acetate copolymer and having a diameter of 3 denier were preliminarily mixed in a mixing ratio shown in Table 1, and the preliminary mixture was melt-kneaded in a twin-screw extruder at about 220° C.

The kneaded mixture was injection-molded at about 230° C. into test pieces having a thickness of ⅛ inch, and the test pieces were measured for flammability, mechanical strength and water resistance. Table 1 shows the results.

Concerning the data in Table 1, the tensile strength and extension were measured according to JIS K7113, the Izod impact strength was measured according to JIS K7110, and the flammability was measured according to UL-94.

EXAMPLE 5 and COMPARATIVE EXAMPLES 4–5

Ultralow-density linear polyethylene (VLLDPE), an aluminum hydroxide surface-treated with 1% by weight of isopropyltriisostearoyltitanate and having a BET specific surface area of 6 $m^2/g$, a BET specific surface area/Blaine specific surface area ratio of 2.1 and an average secondary particle diameter of 1.0 $\mu m$, and an acrylic fiber formed of polyacrylonitrile and having a diameter of 2 denier were preliminarily mixed in a mixing ratio shown in Table 1. Then, the preliminary mixture was melt-kneaded in a twin-screw extruder at 160° C. The resultant kneaded mixture was pressmolded at 160° C. into test pieces having a thickness of ⅛ inch, and the test pieces were measured for various properties.

Table 1 shows the results.

TABLE 1

| | Composition | | | Mixing ratio | | |
|---|---|---|---|---|---|---|
| | Resin | Metal hydroxide | Acrylic fiber | Resin | Metal hydroxide | Acrylic fiber |
| Example 1 | Polypropylene | Magnesium hydroxide | Polyacrylonitrile | 49 | 51 | 1 |
| Example 2 | Polypropylene | Magnesium hydroxide | Polyacrylonitrile | 48 | 52 | 1 |
| Example 3 | Polypropylene | Magnesium hydroxide | Polyacrylonitrile | 46 | 54 | 5 |
| Example 4 | Polypropylene | Magnesium hydroxide | Polyacrylonitrile | 48 | 52 | 0.5 |
| C-Example 1 | Polypropylene | Magnesium hydroxide | — | 48 | 52 | 0 |

TABLE 1-continued

| | | | | | | |
|---|---|---|---|---|---|---|
| C-Example 2 | Polypropylene | Magnesium hydroxide | — | 40 | 60 | 0 |
| C-Example 3 | Polypropylene | — | Polyacrylonitrile | 100 | 0 | 1 |
| Example 5 | VLLDPE | Aluminum hydroxide | Polyacrylonitrile | 50 | 50 | 1 |
| C-Example 4 | VLLDPE | Aluminum hydroxide | — | 42 | 58 | 0 |
| C-Example 5 | VLLDPE | — | — | 100 | 0 | 0 |

| | Flammability UL-94VE 1/8 inch | Tensile strength Yield point kg·f/cm$^2$ | Breaking extension % | Izod impact strength kg·fcm/cm | Volume resistivity Immersed at 70° C. for 7 days ohm·cm |
|---|---|---|---|---|---|
| Example 1 | V-1 | 220 | 115 | 16 | 3.6 × 10$^{15}$ |
| Example 2 | V-0 | 216 | 100 | 15 | 3.1 × 10$^{15}$ |
| Example 3 | V-0 | 201 | 113 | 13 | 2.9 × 10$^{15}$ |
| Example 4 | V-0 | 210 | 95 | 16 | 3.1 × 10$^{15}$ |
| C-Example 1 | HB | 204 | 80 | 16 | 3.1 × 10$^{15}$ |
| C-Example 2 | V-0 | 175 | 12 | 4 | 1.2 × 10$^{14}$ |
| C-Example 3 | out of standard | 280 | 640 | 10 | 8.2 × 10$^{16}$ |
| Example 5 | V-0 | 130 | 750 | — | 6.8 × 10$^{14}$ |
| C-Example 4 | V-0 | 84 | 650 | — | 1.1 × 10$^{14}$ |
| C-Example 5 | out of standard | 165 | 800 | — | 9.3 × 10$^{16}$ |

EXAMPLE 6 and COMPARATIVE EXAMPLE 6

EPDM, a magnesium hydroxide surface-treated with 1% by weight of oleic acid and having a BET specific surface area of 9 m$^2$/g and a BET specific surface area/Blaine specific surface area ratio of 1.4, and a 2 denier acrylic fiber formed of a copolymer of acrylonitrile and vinyl chloride were preliminarily mixed in a mixing ratio shown in Table 2. Then, various additives were incorporated into the resultant preliminary mixture such that the resultant composition had the following composition ratio.

| | |
|---|---|
| Preliminary mixture | 100 parts |
| Zinc oxide | 5 parts |
| Promotor TT | 1.5 parts |
| Promotor M | 0.5 part |
| Sulfur | 1.5 parts |
| Stearic acid | 1.0 part |

The above promotor TT stands for tetramethylthiuramdisulfide, and the promotor M for 2-mercaptobenzothiazole.

The above composition was kneaded at 150° C. by using a roll, and then cured at 160° C. for 30 minutes in a press molding machine. Test pieces prepared were No. 3 dumbbell specimens according to JIS K6301.

Table 2 shows physical properties of the test pieces. Concerning the data in Table 2, the tensile strength and extension were measured according to JIS K6301, and the flammability was measured according to UL-94.

TABLE 2

| | Composition (wt. %) | | | Flammability UL-94 1/8 inch | Breaking tensile strength kg·f/cm$^2$ | Extension % |
|---|---|---|---|---|---|---|
| | EPDM | Magnesium hydroxide | Acrylic fiber | | | |
| Example 6 | 49 | 51 | 1 | V-0 | 115 | 450 |
| C-Example 6 | 40 | 60 | 0 | V-0 | 84 | 320 |

What is claimed is:

1. A fire-retardant resin composition comprising 20 to 80% by weight of a constituent selected from the group consisting of synthetic resin and rubber, 80 to 20% by weight of a metal hydroxide, and 0.1 to 10 parts by weight, based on 100 parts by weight of the synthetic resin or rubber and the metal hydroxide in total, of an acrylic fiber.

2. A composition according to claim 1, wherein the metal hydroxide is a hydroxide of a divalent or trivalent metal.

3. A composition according to claim 2, wherein the metal hydroxide has a BET specific surface area of 1 to 20 m$^2$/g and a BET specific surface area/Blaine specific surface area ratio of 1 to 3.

4. A composition according to claim 3, wherein the metal hydroxide has a BET specific surface area/Blaine specific surface area ratio of 1 to 2.

5. A composition according to claim 2, wherein metal hydroxide is treated with at least one surface treating agent selected from the group consisting of a higher fatty acid, an alkali metal salt of a higher fatty acid, a silane coupling agent, a titanate-based coupling agent, an aluminium-based coupling agent and a phosphoric acid partial esterification ester.

6. A composition according to claim 1, wherein the acrylic fiber is a polymer or copolymer of acrylonitrile.

7. A composition according to claim 1, which comprises 0.5 to 5 parts by weight, based on 100 parts by weight of the synthetic resin or rubber and the metal hydroxide in total, of the acrylic fiber.

8. A fire retardant comprising 100 parts by weight of a metal hydroxide and 0.1 to 50 parts by weight of an acrylic fiber.

9. A fire retardant according to claim 8, wherein the metal hydroxide is a hydroxide of a divalent or trivalent metal.

10. A fire retardant according to claim 9, wherein the metal hydroxide has a BET specific surface area of 1 to 20 $m^2/g$ and a BET specific surface area/Blaine specific surface area ratio of 1 to 3.

11. A fire retardant according to claim 9, wherein the metal hydroxide is treated with a surface treating agent.

12. A fire retardant according to claim 11, wherein the surface treating agent is at least one member selected from the group consisting of a higher fatty acid or an alkali metal salt thereof, a silane coupling agent, a titanate-based coupling agent, an aluminum-based coupling agent and a phosphoric acid partial esterification ester.

13. A fire retardant according to claim 8, wherein the acrylic fiber is a polymer or copolymer of acrylonitrile.

* * * * *